May 31, 1966
R. E. NUCKLES
3,253,297
SAUSAGE STUFFING APPARATUS
Filed July 16, 1964
5 Sheets-Sheet 1
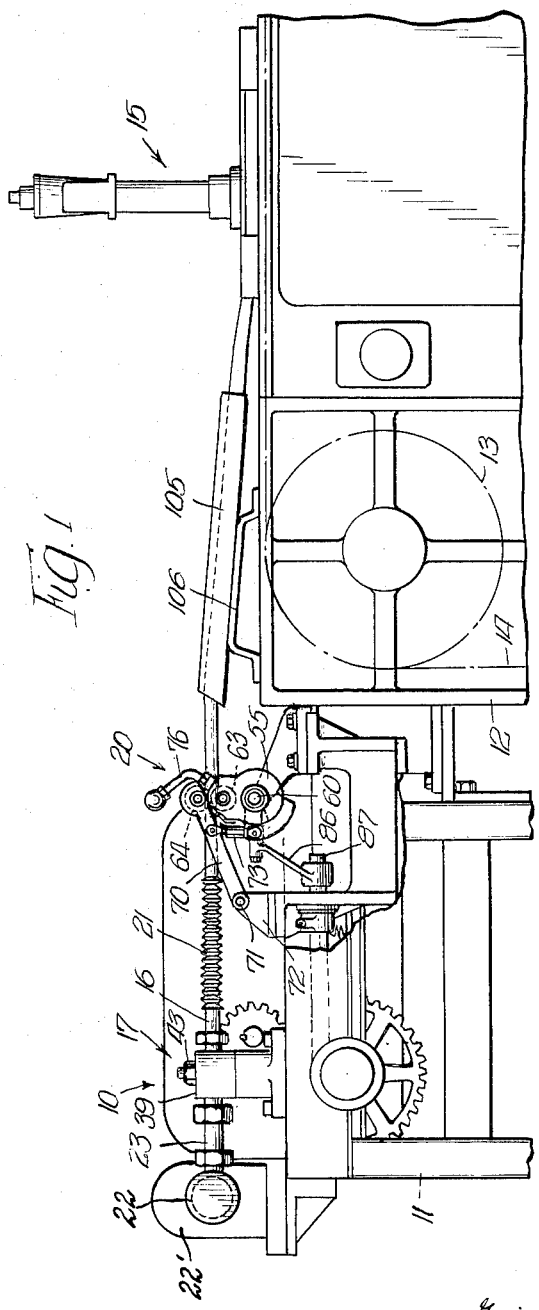
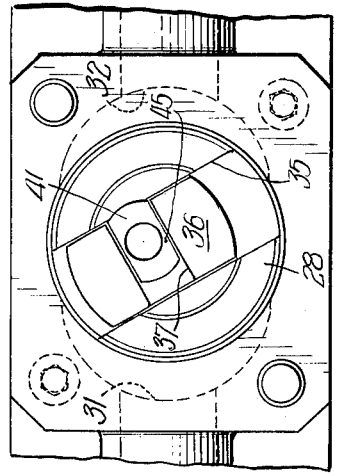
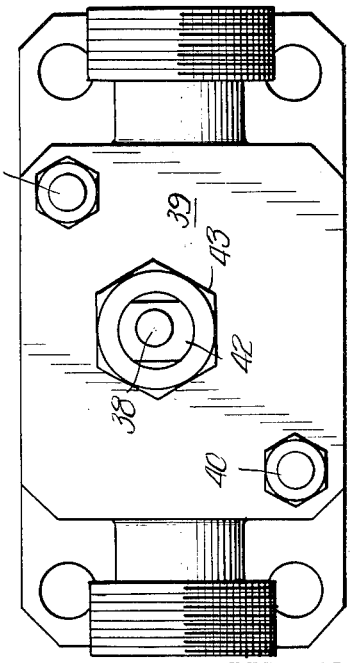
INVENTOR.
Robert E. Nuckles,
BY
Grist, Lockwood, Greenawalt & Dewey.
Attys

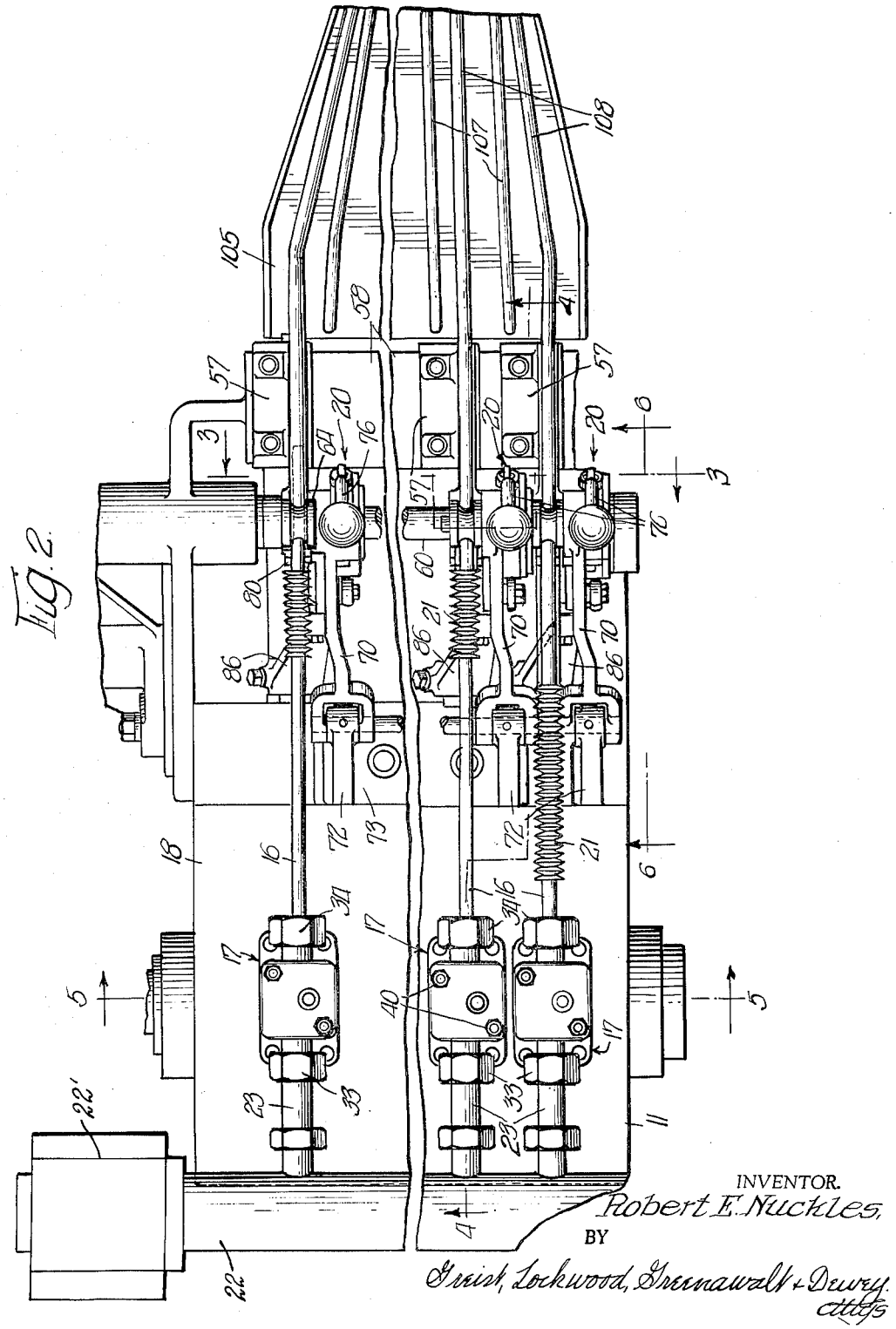

May 31, 1966  R. E. NUCKLES  3,253,297
SAUSAGE STUFFING APPARATUS
Filed July 16, 1964  5 Sheets-Sheet 3

INVENTOR.
Robert E. Nuckles,
BY

May 31, 1966 R. E. NUCKLES 3,253,297
SAUSAGE STUFFING APPARATUS
Filed July 16, 1964 5 Sheets-Sheet 4
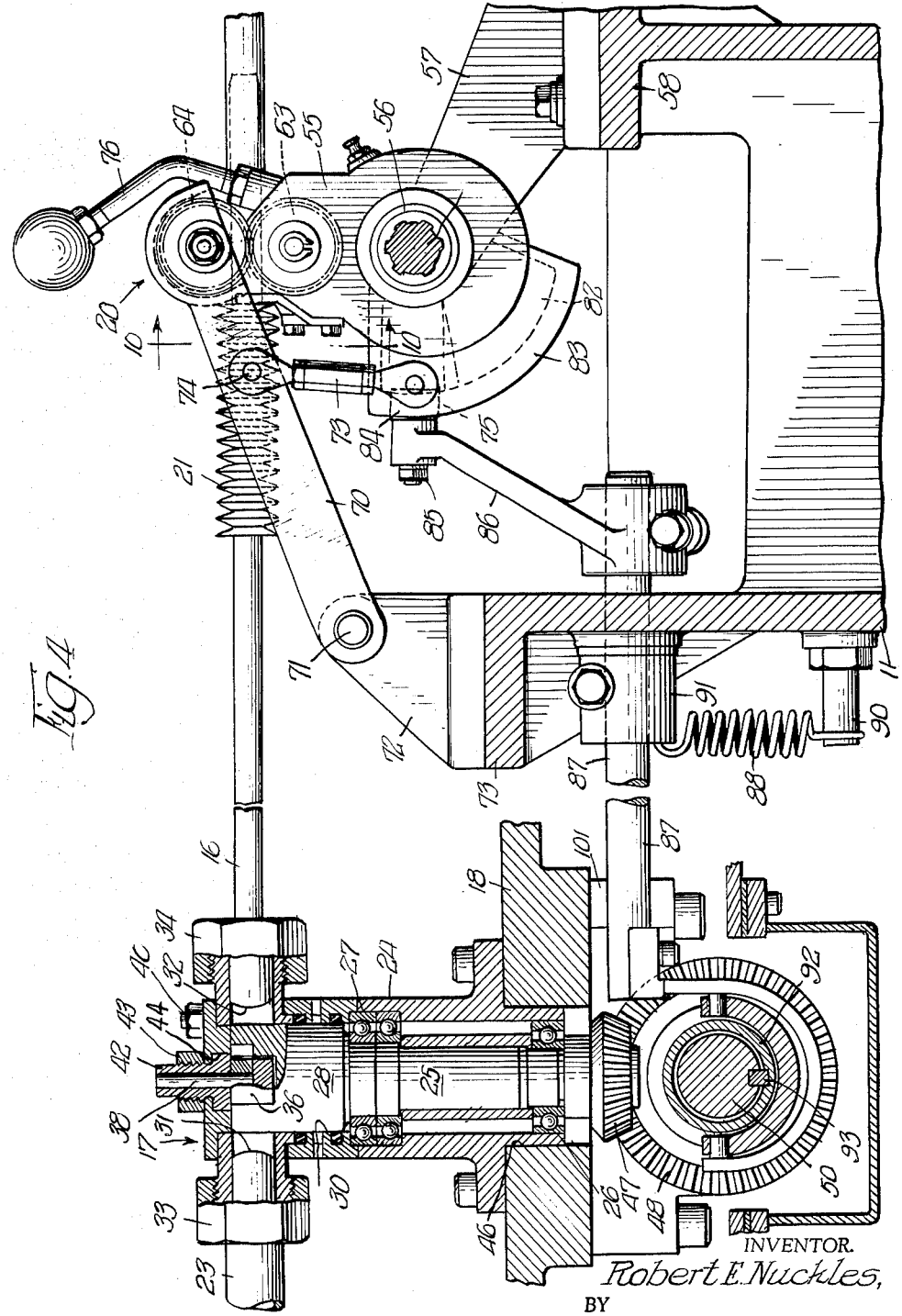
INVENTOR.
Robert E. Nuckles,
BY
Grist, Lockwood, Greenawalt & Dewey
ATTYS May 31, 1966 R. E. NUCKLES 3,253,297
SAUSAGE STUFFING APPARATUS
Filed July 16, 1964 5 Sheets-Sheet 5
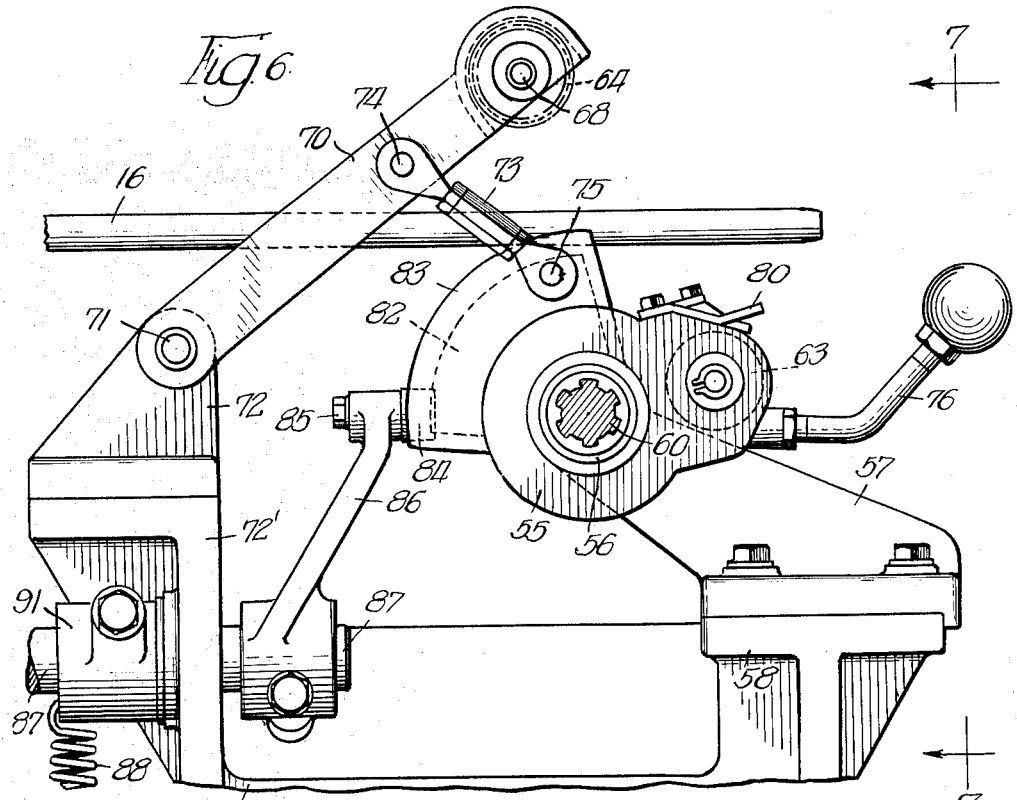
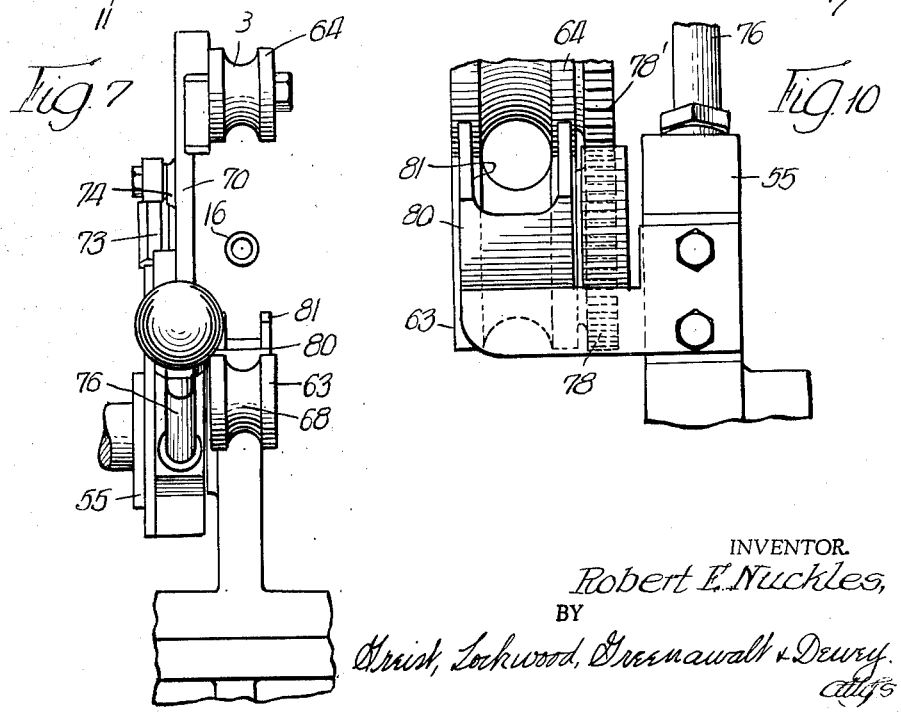
INVENTOR.
Robert E. Nuckles,
BY
Grist, Lockwood, Greenawalt & Dewey
attys

United States Patent Office 3,253,297
Patented May 31, 1966

3,253,297
SAUSAGE STUFFING APPARATUS
Robert E. Nuckles, Madison, Wis., assignor to Oscar Mayer & Co., Inc., Chicago, Ill., a corporation of Illinois
Filed July 16, 1964, Ser. No. 383,058
11 Claims. (Cl. 17—35)

This invention relates to the manufacture of sausages wherein relatively long lengths of casing are stuffed or filled with the sausage batter, the stuffed casing is divided into links by constricting the same at intervals according to the desired length of the sausages and thereafter the links are cooked or smoked while they are held in connected relation.

Apparatus for manufacturing or processing sausages in a continuous manner has heretofore been designed. One such apparatus has been disclosed in Patent No. 3,059,272 granted to Richard J. Millenaar on October 23, 1962 which is adapted to automatically divide a filled or stuffed casing into sections of predetermined length by constricting the casing at intervals to form the stuffed casing into links and thereafter convey the connected links in a continuous stream through a series of chambers for smoking and cooking the same. Such apparatus requires a mechanism for supplying in a substantially continuous manner stuffed casing to a conveyor on which the links are formed and subsequently conveyed through the smoking and cooking chambers. A mechanism for accomplishing this purpose which may be incorporated in a continuous processing machine is disclosed in the co-pending application of Richard J. Millenaar and Edmund G. Blair, Serial No. 185,167 filed April 4, 1962, now Patent No. 3,166,784, dated January 26, 1965, which mechanism comprises means for stuffing a plurality of relatively long lengths of sausage casing with a sausage mixture of batter and for feeding the stuffed casings in a continuous and uniform manner to cross bar supported casing constricting devices spaced along a continuously traveling conveyor on which the links are formed and then conveyed through the processing chambers. While this mechanism has operated in a satisfactory manner some problems have developed in connection with its use and it is a general object of the present invention to provide improvements in such apparatus so as to achieve a more accurate control of the stuffing operation and obtain a product of a more uniform character.

It is a specific object of the invention to provide an improved apparatus for stuffing simultaneously a plurality of lengths of sausage casing with a uniform quantity of batter and for feeding the stuffed casings to a continuously moving conveyor having associated therewith apparatus for forming the casings into links by dividing the same into sections of predetermined length and constricting the casing between the sections, with the links thus formed being retained in connected relation on the conveyor for subsequent processing.

It is a further object of the invention to provide an apparatus for simultaneously stuffing a plurality of lengths of sausage casing and for thereafter feeding the stuffed casing to a link forming apparatus on a traveling conveyor wherein the flow of the batter to the individual casings is controlled so that uniformity is obtained in the sausage links which are subsequently formed by means of individual batter flow control devices which meter the batter delivered to each casing length and which are adjustable so as to provide uniform delivery of the batter with the devices connected to a single supply line.

It is a more specific object of the invention to provide a casing stuffing and feeding apparatus which comprises a series of stuffing nozzles each connected to a common supply conduit and flow metering devices interposed between the nozzles and the supply conduit which are operated to control the flow of the batter through the nozzles with the metering devices being individually adjustable so as to enable the operator to obtain uniformity in the stuffed casing and in the links which are subsequently formed therein by associated linking mechanism.

It is a further object of the invention to provide a sausage stuffing apparatus which comprises a series of stuffing nozzles each having associated therewith a casing feeding device and a batter metering device which batter metering device is adjustable for controlling the flow of the batter through the nozzles and into the casing so that a uniform quantity of the batter is delivered in a continuous stream at the end of each nozzle for stuffing each length of casing.

It is another object of the invention to provide a sausage stuffing and feeding apparatus which comprises a series of stuffing nozzles each having a free end adapted to receive a length of empty casing thereon in shirred condition and a stuffed casing feeding device associated with each nozzle which may be quickly moved to an inoperative position so as to provide access to the end of the nozzle and facilitate loading of the nozzle with the empty casing.

It is still another object of the invention to provide a sausage stuffing apparatus which comprises a series of stuffing nozzles each having associated therewith a casing feeding device and a batter metering device wherein the batter metering device is in the form of a pump which is connected to a batter supply line and operated from a common drive mechanism with the casing feeding device being movable to an inoperative position to facilitate loading of an empty casing onto the associated stuffing nozzle and the drive for the metering device being controlled by movement of the casing feeding device so as to interrupt the flow of batter when the casing feeding device is moved to the inoperative position.

These and other objects and advantages of the invention will be apparent from a consideration of the apparatus which is shown by way of illustration in the accompanying drawings wherein:

FIGURE 1 is a side elevation of a casing stuffing apparatus and a portion of an associated link forming and conveying apparatus embodying the principal features of the invention;

FIGURE 2 is a plan view of the stuffing apparatus, to an enlarged scale, and with portions thereof broken away;

FIGURE 4 is a longitudinal vertical section taken on the line 4—4 in FIGURE 2, to a larger scale and with portions broken away;

FIGURE 6 is a partial elevational view taken on the line 6—6 of FIGURE 2, to a larger scale and with portions broken away, the view showing one of the stuffed casing feeding devices moved to non-feeding position;

FIGURE 7 is a fragmentary elevational view taken on the line 7—7 of FIGURE 6;

FIGURE 8 is an enlarged top plan view of one of the batter metering devices,

FIGURE 9 is a plan view, with the top plate removed, of the metering device shown in FIGURE 8; and FIGURE 10 is a fragmentary vertical section taken on the line 10—10 of FIGURE 4 to a larger scale.

Figure 3:
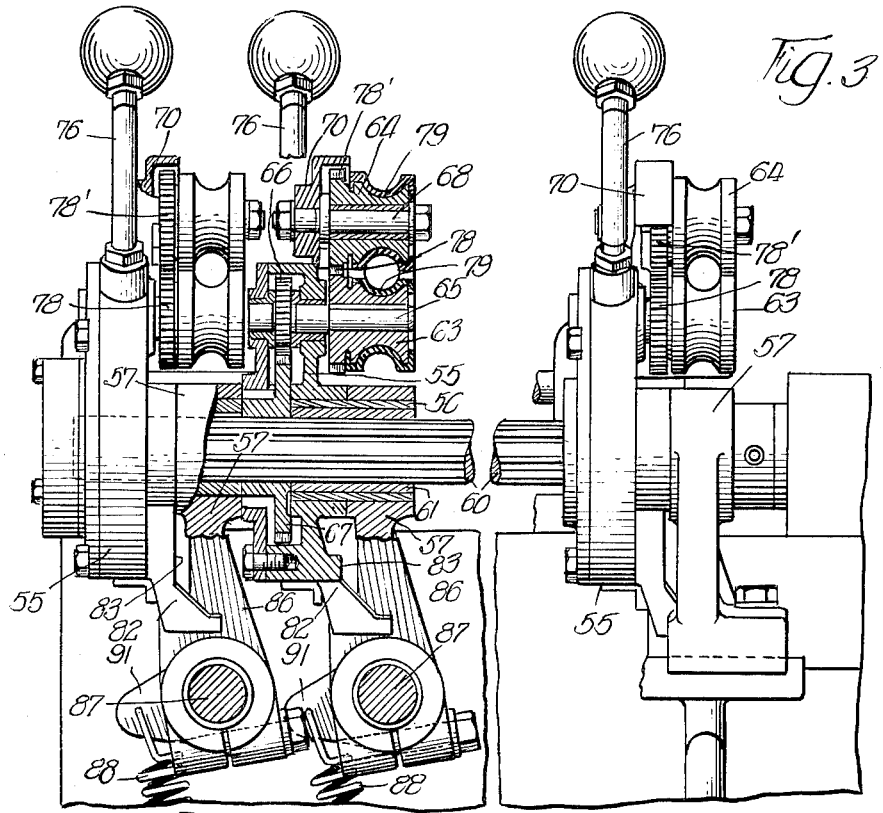
FIGURE 3 is a vertical cross section taken on the line 3—3 of FIGURE 2, to a still larger scale, and with portions broken away.

Referring to FIGURES 1 and 2 of the drawings the casing stuffing apparatus 10 is mounted on an upright supporting frame 11 which is positioned at the receiving end of a main supporting frame 12, the latter carrying a vertically spaced pair of end sprockets 13 (only one of which is shown) constituting end supports for a linking and transporting conveyor indicated at 14. The conveyor 14 has an upper horizontal run which moves past a linking station 15 where the stuffed sausage casings are linked and secured on the conveyor by which they are carried to processing chambers (not shown) in which the links are cooked and smoked and otherwise processed. The general arrangement of the apparatus corresponds to the arrangement disclosed in co-pending application Serial No. 185,167, now Patent No. 3,166,784, to which reference may be had for details not hereinafter described.

The stuffing apparatus 10 comprises a series of horizontally disposed elongate stuffing nozzles 16 (FIGURES 1 and 2) which are supported in longitudinally extending transversely spaced relation on upright metering devices 17. The metering devices 17 are arranged in transverse alignment at the trailing end of the frame plate 18 which forms part of the top structure of the upright supporting frame 11. Each of the stuffing nozzles or horns 16 extends between a metering device 17 to which it is connected at its trailing end and a casing feeding device 20 (FIGURES 1 to 4, 6 and 7) which is spaced forwardly of the metering device 17 adjacent the leading end of the stuffing horn 16. A plurality of the feeding devices 20 extend transversely of the plate 18 adjacent the leading end thereof and each feeding device 20 is in longitudinal alignment with one of the metering devices 17. Each of the stuffing nozzles or horns 16 is, of course, adapted to receive in shirred relation thereon a quantity of empty sausage casing 21, which, ordinarily, will have a length in the neighborhood of 50 to 100 feet. The empty casing 21 is initially gathered in telescoped relation onto the stuffing nozzle or horn 16 and subsequently forced from the leading end thereof by movement of the batter through the metering device 17, the latter controlling the flow of the batter through the stuffing nozzle 16 which is connected thereto.

Each of the metering devices 17 (FIGURES 1, 2, 4, 8, and 9) is connected to a transversely disposed common supply conduit 22 which forms the feed pipe or conduit for the metering device. The main supply conduit 22 is in turn connected to a suitable supply pump indicated at 22' in FIGURES 1 and 2, from which the batter is delivered to the conduit 22 under a predetermined constant pressure. The individual metering devices 17 control the flow of the batter into the stuffing nozzles 16 and each metering device 17 is adjusted and operated as hereinafter described so as to achieve the correct weight in the finished product.

Each of the metering devices 17 (FIGURES 4, 8 and 9) comprises an upright cylindrical housing member 24 having a vertically disposed cylindrical operating spindle 25 rotatably mounted therein by means of the vertically spaced bearing assemblies 26 and 27. The upper end or head portion 28 of the spindle 25 has an enlarged diameter and rotates in a vertical bore 30 in the uppermost portion of the housing 24 between the inlet and discharge openings 31 and 32, the latter being connected by suitable couplings 33 and 34 with the feed pipe 23, which extends to the supply conduit 22, and the nozzle 16, respectively. The spindle head 28 is provided in the top with a diametrical slot 35 (FIGURE 9) which is of generally rectangular cross section. The slot 35 receives a horizontally disposed plunger member 36 having a cross slot 37 in its upper face into which projects the lower end of a pin 38 depending from a top closure plate 39. The closure plate 39 is secured in position by a pair of stud fasteners 40. The pin 38 carries on its lower end a slide 41 which is seated in the slot 37 and which has a bore in which the lower end of the pin 38 is rotatably received. The pin 38 is mounted in a rotatable bushing 42 with its vertical axis eccentric to the center of rotation of the bushing 42 so that when the bushing 42 is rotated the eccentricity of the plunger pin 38 relative to the spindle head 28 is changed thus changing the length of stroke, swept volume and delivery of the metering device. A lock nut 43 engages the threaded outer surface of the upper portion of the bushing 42 and locks it in adjusted position in the aperture 44 in the plate 39 when the desired length of stroke has been established.

The uppermost bearing assembly 27 supporting the spindle 25 comprises a pair of angular contact bearings mounted in opposition and mutually preloaded which enables the clearance between the top surface of the head portion 28 of the spindle 25 and the bottom surface of the cover plate 39 to be accurately adjusted and made as small as possible so as to minimize any fluid flow through this clearance space. The vertical axis of the spindle 25 is indicated at 45 in FIGURE 9 and it can be seen that the vertical axis of pin 38 is offset relative thereto so that upon rotation of the spindle 25 the plunger 36 moves back and forward in the slot 35 in the top of the plunger head 28. The plunger 36 is of less length than the length of the slot 35 and is operated by the pin 38 in timed relation to rotation of the spindle 25 so as to deliver measured charges of the batter from the inlet port 31 to the outlet port 32 of the device, thereby insuring a constant, uniform flow of batter to the stuffing nozzle 16 and the delivery at the end of the stuffing nozzle 16 of a continuous stream of batter.

Figure 5:
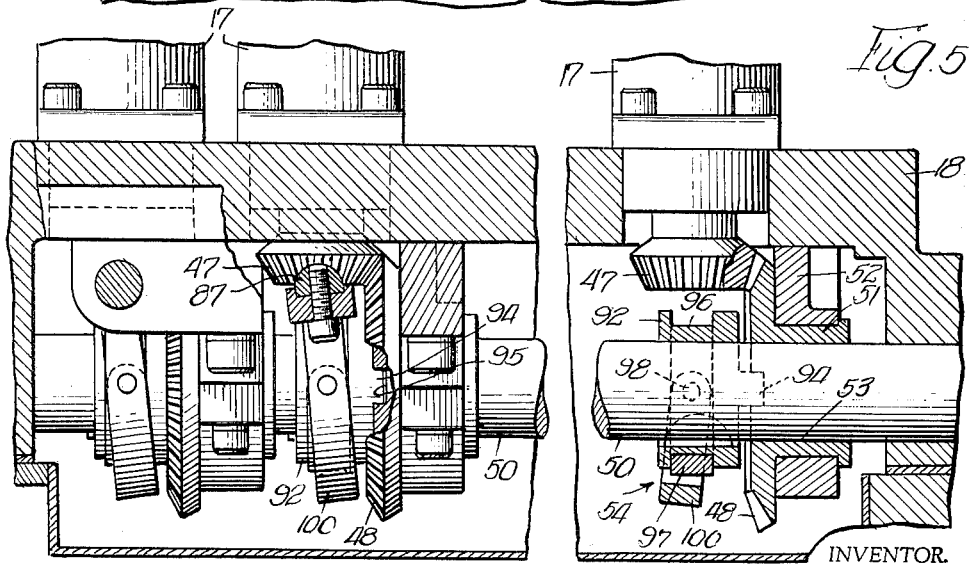
FIGURE 5 is a partial vertical cross section taken on the line 5—5 of FIGURE 2 to a larger scale and with portions broken away.

The supporting plate 18 is apertured at 46 (FIGURE 4) to receive the lower end of the spindle housing 24 which is bolted or otherwise secured on the plate 18. The spindle 25 is of sufficient length to extend beneath the plate 18 and carries a miter gear 47 on its lower end which is in toothed engagement with a co-operating miter gear 48 on a cross drive shaft 50. The gear 48 has a hub portion 51 (FIGURE 5) which is rotatably mounted in a bearing bracket 52 depending from the lower face of the frame plate 18 and the drive shaft 40 extends through the bore 53 in hub 51 so that the gear 48 is mounted on drive shaft 50 for free rotation. It is connected in driving relation with the shaft 50 by means of the clutch mechanism 54.

Each of the filled casing feeding devices 20 (FIGURES 3, 4, 6 and 7) is aligned, in the longitudinal direction of the machine, with an associated stuffing nozzle 16 and its metering device or pump 17. The casing feeding devices 20 are spaced forwardly of the metering devices 17 and aligned transversely of the machine. Each of the feeding devices 20 comprises a plate-like two-part housing forming bracket 55 which is disposed in a longitudinal vertical plane and mounted for pivotal movement about a tubular bushing 56. The bushing 56 is mounted in laterally spaced fixed supporting brackets 57 extending upwardly of a cross bar 58 on the frame 11.

The brackets 57 (FIGURE 3) support a drive shaft 60 having splined sleeves 61 which are received within the bushings 56. The shaft 60 extends parallel with the drive shaft 50 for the metering devices 17. The housing 55 supports the lowermost one of a pair of co-operating casing engaging rollers 63 and 64. The lowermost roller 63 is mounted on a shaft 65 which extends from the housing 55 and is journaled therein. The shaft 65 carries a gear 66 within the housing 55 which engages with a gear 67 mounted on the drive shaft 60. The uppermost roller 64 of the pair of rollers 63 and 64 is mounted for free rotation on a stub shaft 68 which extends laterally of one end of a supporting arm 70 (FIGURES 4 and 6). The arm 70 is pivotally mounted at its other end at 71 on a bracket 72 mounted in upstanding relation on a cross bar forming portion 72' of the supporting frame 11. A link member 73 is pivotally connected at one end to the roller supporting arm 70 at 74 and at its other end to the housing 55 at 75. The pivot 75 is radially spaced from the axis of the shaft 60 about which the housing 55 is adapted to turn. The connecting link member 73 is adjustable to vary its length and thereby adjust the spacing between the casing engaging rollers 63 and 64. A handle forming arm member 76 extends upwardly of the housing 55, in FIGURES 1, 3, and 4, to permit manual rotation of the housing 55 about the bushing 56. The link 73 forming the connection between the housing 55 and the roller supporting arm 70 causes the arm 70 to swing upwardly or in a counterclockwise direction, as viewed in FIGURES 4 and 6, about the pivot 71 when the housing 55 is swung in a clockwise direction so as to separate the rollers 63 and 64 and move them out of casing engaging or gripping position to enable an empty casing 21 to be telescoped onto the stuffing horn 16. The rollers 63 and 64 are in the open or non-operative position in FIGURES 6 and 7 and in the closed or operating position in FIGURE 4. The rollers 63 and 64 have integral gears 78 and 78' which interengage in the closed position so that they rotate in unison with the lowermost roller 63 being driven from the drive shaft 60 through gears 66 and 67. The rollers 63 and 64 are grooved to conform generally to the surface of the stuffed casing and may be provided with cooperating pairs of casing gripping tire members 79 of resilient rubber-like material which grip the casing and advance the casing beyond the free end of the nozzle 16. Each of the housings 55 carries a small guide forming plate 80 (FIGURES 4, 6 and 10) having an outwardly or upwardly opening slot 81 in a free edge thereof for engaging the shirred casing 21 at the end of the nozzle 16 so as to insure that it comes off the nozzle 16 smoothly.

Each of the housings 55 carries a semi-circular cam member 82 (FIGURES 3, 4 and 6) having a cam track 83 which is engaged by a cam follower roller 84 mounted on a stub shaft 85 on the free end of an arm 86. The arm 86 is secured at its other end to a rock shaft 87 extending longitudinally of the frame 11 and journaled in bearing members thereon. A tension spring 88 is anchored at one end on a pin 90 extending from the frame 11 and is connected at its other end to a small lever arm 91 mounted on the rock shaft 87. The rock shaft 87 extends to the clutch 53 for the associated metering device 17 and is connected thereto for operating the same. The clutch 53 comprises a clutch sleeve 92 (FIGURES 4 and 5) which is mounted for axially sliding movement on the drive shaft 50 by an axially extending key 93. The sleeve 92 has a plurality of axially extending peripherally spaced teeth 94 on the end thereof which is adjacent the gear 47 which teeth are engaged in co-operating recesses 95 in the face of the gear 48 so that when the sleeve 92 is moved axially to bring the teeth into engagement with the gear 48 the gear and sleeve interlock and the gear 48 is rotated with the shaft 50. The sleeve 92 is provided with a peripheral recess 96 on its exterior wall which receives a C-shaped slide member 97 having axially aligned pivot pins 98 extending from its opposite ends which connect the same with a C-shaped operating yoke 100. The yoke 100 is secured on the end of rock shaft 87, the latter extending beneath the support plate 18 with its end supported in a depending bearing bracket 101. The rock shaft 87 is rotated in response to rotation of the housing 55 about the bushing 56 which swings the yoke 100 to move the clutch sleeve 92 into or out of engagement with the gear 48 so that when the housing 55 is in the position shown in FIGURE 4 and the casing feeding rollers 63 and 64 are in driving engagement with the filled casing, the clutch sleeve 92 is locked with the gear 48 and the spindle 25 of the metering device 17 is rotated to deliver the batter to the nozzle 16. When the housing 55 is swung to the open or non-operating position, as shown in FIGURE 6, the shaft 87 is rocked to disengage the clutch mechanism 53 which stops the feed of the batter to the nozzle 16 while a new length of casing is being placed on the latter.

The two drive shafts 50 and 60 may be connected to a common drive mechanism at one side of the supporting frame 11 as described in co-pending application Serial No. 185,167 and derived from a rotating portion of the main drive for the machine.

The casing feeding rollers 63 and 64 advance the casing from the stuffing nozzle 16 to a guide tray 105 (FIGURES 1 and 2) which is supported in generally horizontal position on the top of the frame 12 by the bracket 106. The tray 105 is divided by longitudinal partitions 107 which guide the stuffed casings to the link forming station 15 where the stuffed casings are laid on cross bar assemblies (not shown) which are carried in longitudinally spaced relation on the conveyor 14 and each of the stuffed casings is divided into a connected series of individual sausage links, with each link being of a length corresponding to the distance between the cross bar assemblies. Suitable cross bar assemblies are described in co-pending application Serial No. 185,167, Patent No. 3,166,784.

In operating the apparatus the nozzles 16 are each initially supplied with a section of casing 21 arranged in shirred relation thereon and the batter supply conduit 22 is connected to a suitable source of batter supply through a pressure pump. Before starting the flow of the batter the empty casing has its leading end tied and threaded between the rollers 63 and 64, the housing 55 being in a non-feeding or open position. The metering devices 17 and the batter supply mechanism are adjusted so that the flow through the metering devices is started by swinging the housing 55 to the upright feeding position. The batter inflates the casing 21 as the flow of batter pushes the respective casings off the ends of the nozzles 16 beyond the feed rollers 63 and 64. The feed rollers 63 and 64 advance the filled casing to the partitioned guide tray 105 which guides the lines of stuffed casing to the linking bar assemblies on the conveyor 14. The operator observes the advance of the casing 21 from each of the nozzles 16 and swings the housing 55 to the operating or feeding position (FIGURE 6) when the length of casing 21 on any of the nozzles 16 is very nearly exhausted so that the trailing end may be pulled off and tied and a new length of casing may be fed onto the nozzle 16 with its leading end tied and threaded between the rollers 63 and 64 after which the housing 55 is returned to casing engaging position and the feeding of the stuffed casing continues. Each nozzle 16 and its associated metering and casing feeding devices 17 and 20 constitutes a separate assembly, subject to manual control of the operator, and any number of these assemblies may be placed in operation, up to full capacity of the apparatus.

The flow of the batter to the metering units 17 is adjustable so as to vary the pressure and thereby the density of the batter as it passes through the metering devices 17 and through the nozzles 16 to fill the casings. The metering devices 17 may be individually adjusted so as to deliver the desired amount of batter to the associated nozzles. The cross bar assemblies on the conveyor 14 are equally spaced longitudinally of the conveyor so that equal lengths of filled casing are trapped between each cross bar assembly and the next adjacent cross bar assembly. The successive links thus formed are each of the same length by reason of the accurate spacing of the cross bar assemblies on the conveyor 14 and the adjustment of the feeding of the batter through the metering devices so that the links have the same content within very close limits and uniformity of product is achieved. The lengths of the shirred casing employed may of course be varied or casings of indefinite lengths may be supplied continuously by extrusion (not shown).

While particular materials and specific details of construction have been referred to in describing the illustrated form of the apparatus it will be understood that other materials and equivalent details of construction may be resorted to within the spirit of the invention.

I claim:

1. A meat stuffing apparatus comprising a supply conduit, means to feed a meat mixture continuously and under uniform pressure to said supply conduit, a plurality of elongate stuffing nozzles mounted in parallel relation adjacent said conduit, each said stuffing nozzle adapted to receive in telescoped relation thereon empty sausage casing, a fluid connection between each stuffing nozzle and said supply conduit and including a flow metering device, each said metering device having a rotating operating element, a power drive shaft, a clutch mechanism connecting said power drive shaft with each said operating element, a stuffed casing gripping and feeding device adjacent the discharge end of each of said stuffing nozzles, said casing gripping and feeding device comprising a pair of casing gripping feed rolls, a bracket forming gear housing having shaft means for supporting one of said feed rolls, a power driven cross shaft, said gear housing being mounted on said cross shaft for rotation about the axis thereof so that it is adapted to swing said feed roll from an operative position where it engages the casing adjacent the end of the stuffing nozzle to an inoperative position providing access to the nozzle for reloading with an empty casing, a driving gear connection between said cross shaft and said feed roll supporting shaft for driving said feed roll, an arm member mounted at one end on a fixed pivot and having a supporting shaft at the other end for the other one of said feed rolls, link means connecting said arm member and said housing so as to move said other one of said feed rolls to inoperative position out of engagement with the casing upon predetermined rotation of said housing about said cross shaft, and operating means for said clutch mechanism which is responsive to movement of said housing whereby the flow of batter through the nozzle is stopped when the casing feed rolls are moved to inoperative position.

2. A sausage stuffing apparatus comprising means for supplying a sausage batter, a nozzle feeding conduit, means for feeding the batter in a continuous stream and under uniform pressure to the nozzle feeding conduit, a series of stuffing nozzles mounted adjacent the nozzle feeding conduit and adapted to receive empty casings thereon, means including individual flow metering devices connecting each of the nozzles with the nozzle feeding conduit, said flow metering devices having rotating reciprocating elements and associated means for delivering batter to the nozzles so as to provide a continuously moving stream thereof at the stuffing ends of the nozzles, manually controlled means for adjusting the stroke of the elements at each individual flow metering device thereby to adjust the volume of batter delivered by each flow metering device and a common power drive means connected to the elements of said metering devices, said power drive means being connected independently of the means for adjusting the stroke of said reciprocating elements whereby the flow metering devices may be individually adjusted so that the volume of batter forced through each of the nozzles can be controlled to enable the casings to be filled uniformly.

3. A sausage stuffing and feeding apparatus comprising a supply conduit, means to deliver a sausage batter in a continuous stream and under uniform pressure to said supply conduit, a plurality of stuffing nozzles mounted adjacent said conduit and adapted to receive in telescoped relation thereon empty sausage casings, a batter flow metering device connected to each of said nozzles, a fluid connection between each metering device and the supply conduit, each metering device having a rotatably mounted flow control member, a power drive shaft for said metering devices, a clutch mechanism connecting each flow control member with said power drive shaft, a power driven feeding mechanism for the stuffed casing mounted adjacent the discharge end of each of said stuffing nozzles, each said casing feeding mechanism comprising a pair of casing engaging rollers, a power shaft for driving said rollers, a gear housing rotatably mounted for movement on an axis coinciding with the axis of said roller driving shaft, a supporting shaft for one of said rollers journaled in said housing, a pair of connecting gears disposed in said housing between said roller driving shaft and said roller supporting shaft, a pivotally mounted bracket forming member, means connecting the housing and the bracket forming member so that upon rotation of said housing the rollers are moved away from each other and out of casing engaging relation and means responsive to movement of said housing to operate the clutch mechanism connecting the flow control member of the metering device of the associated nozzle with the power drive shaft.

4. A sausage stuffing and feeding apparatus as recited in claim 3 and said means to operate the clutch mechanism including an operating shaft extending between said power drive shaft for said metering devices and said roller driving shaft, a cam on said gear housing and a cooperating cam follower mounted on said operating shaft.

5. An apparatus for stuffing a fluid product into a flexible casing comprising a supply conduit, means to deliver the product in a continuous stream and under uniform pressure to said supply conduit, a plurality of stuffing nozzles mounted adjacent said conduit and adapted to receive in telescoped relation thereon empty lengths of casing, a flow metering device supporting each of said nozzles, a connection between each metering device and the supply conduit, each metering device having a rotatably mounted flow control member, a power drive shaft for said metering devices, a clutch mechanism connecting each flow control member with said power drive shaft, a power driven feeding mechanism for the casing mounted adjacent the discharge end of each of said stuffing nozzles, said casing feeding mechanism comprising a pair of co-operating feed rollers swingable into and out of casing gripping position where the stuffed casing is advanced beyond the stuffing nozzle by said feed rollers, a pivotally mounted housing supporting one of said feed rollers, a pivotally mounted arm supporting the other feed roller, a link pivoted at opposite ends to said housing and said arm whereby said housing may be swung about its pivot mounting to move the associated feed roller out of casing gripping position, and said arm will swing with said housing to move the co-operating feed roller out of casing gripping position, a clutch operating shaft extending between each casing feeding mechanism and its associated metering device, co-operating cam means on said clutch operating shaft and said housing which is operative in response to movement of said housing whereby to engage and disengage the clutch connecting the flow control member of the metering device of the associated stuffing nozzle and the power drive shaft thereby to stop the flow through the nozzle when the casing feed rollers are moved out of casing gripping position.

6. A sausage stuffing apparatus comprising means for supplying a sausage batter, a nozzle feeding conduit, means for feeding the batter in a continuous stream and under uniform pressure to the nozzle feeding conduit, a plurality of stuffing nozzles mounted along the nozzle feeding conduit and adapted to receive empty casings thereon, flow metering devices connecting the individual nozzles with the nozzle feeding conduit, said flow metering devices having rotating reciprocating elements and associated means for delivering batter to the nozzles so as to provide a continuously moving stream of batter at the stuffing ends of the nozzles, manually controlled means for adjusting the throw of said elements of each individual flow metering device so as to vary the amount of batter delivered by each flow metering device and a common power drive means connected to the rotating elements of said metering devices independently of said adjusting means whereby the flow of batter through each of the metering devices may be adjusted to control the amount of batter forced through the individual nozzles and into the casings so as to obtain uniform filling of the casings.

7. A sausage stuffing and feeding apparatus comprising a supply conduit, means to deliver a sausage batter in a continuous stream and under uniform pressure to said supply conduit, a plurality of stuffing nozzles mounted along said conduit and adapted to receive in telescoped relation thereon empty sausage casings, a batter flow control device supporting each of said nozzles, a fluid connection between each flow control device and the supply conduit, each flow control device having a rotatable control member, a single power drive means for said flow control devices, a clutch mechanism connecting each flow control member with said power drive means, a stuffed casing feeding mechanism mounted adjacent the discharge end of each of said stuffing nozzles, each said feeding mechanism comprising a pair of rollers having co-operating grooved surfaces for engaging the casing, a power drive shaft for said rollers, a housing rotatably mounted for movement on an axis coinciding with the axis of said power drive shaft, a roller shaft journaled in said housing and connecting gears between said power drive shaft and said roller shaft, a pivotally mounted bracket forming arm member, link means connecting the housing and the arm member whereby upon rotation of said housing the rollers are moved out of casing engaging relation and means responsive to rotation of said housing for disengaging the clutch mechanism connecting the flow control member of the metering device of the associated nozzle with the power drive shaft so as to stop the flow of batter to the nozzle.

8. An apparatus for stuffing a fluid product into a flexible casing comprising a supply conduit, means to deliver the product in a continuous stream and under uniform pressure to said supply conduit, a plurality of stuffing nozzles mounted in parallel relation adjacent said conduit and adapted to receive in telescoped relation thereon empty lengths of casing, a flow metering device for each of said nozzles, a connection between each metering device and the supply conduit, each metering device being in the form of a pump having a rotatably mounted flow control member, a power drive shaft for said metering devices, a clutch mechanism connecting each flow control member with said power drive shaft, a driven feeding mechanism for the casing disposed adjacent the discharge end of each of said stuffing nozzles, said casing feeding mechanism comprising a pair of co-operating feed rollers having grooved peripheries conforming to the contour of the filled casing and mounted to swing into and out of casing engaging position to advance the filled casing beyond said end of the stuffing nozzle, a pivotally mounted housing having a shaft extending therefrom for supporting one of said feed rollers, a pivotally mounted arm having a shaft extending therefrom for supporting the other feed roller, said feed roller shafts having co-operating gears which interengage when the feed rollers are positioned to engage the casing, a link pivoted at opposite ends to said housing and said arm whereby when said housing is pivoted in one direction the associated feed roller moves out of casing engaging position and said arm pivots to move the co-operating feed roller out of casing engaging position, a shaft for controlling the operation of said clutch mechanism extending between each casing feeding mechanism and its associated metering device, connecting means between said shaft and said housing which operates said shaft in response to movement of said housing whereby to engage and disengage the clutch mechanism connecting the flow control member of the metering device of the associated stuffing nozzle and the power drive shaft thereby to stop the flow of product through the nozzle when the casing feed rollers are swung out of casing engaging position.

9. A sausage stuffing and feeding apparatus comprising a supply conduit, means to deliver a sausage batter in a continuous stream and under uniform pressure to said supply conduit, a plurality of stuffing nozzles mounted in parallel spaced relation along said conduit and each adapted to receive in telescoped relation thereon empty sausage casings in shirred relation, a batter flow metering device between each of said nozzles and said supply conduit, a connection between each metering device and the supply conduit, each metering device having a rotatably mounted flow control member, a power drive shaft for said metering devices, a clutch mechanism connecting each flow control member with said power drive shaft, a power driven feeding mechanism for the stuffed casing mounted adjacent the discharge end of each of said stuffing nozzles, each said casing feeding mechanism comprising a pair of casing engaging rollers, a power drive shaft for said rollers, a housing rotatably mounted for movement on an axis coinciding with the axis of said power drive shaft, a supporting shaft for one of said rollers journaled in said housing, co-operating gears in said housing forming a driving connection between said power drive shaft and said roller supporting shaft, a pivotally mounted arm member, means connecting the housing and the arm member whereby upon rotation of said housing the rollers are each moved away from casing engaging position and means responsive to movement of said housing to operate the clutch mechanism connecting the flow control member of the metering device of the associated nozzle with the power drive shaft.

10. A sausage stuffing and feeding apparatus as recited in claim 9 and a device mounted on said housing which is movable with said housing into and out of engagement with the empty casing on the nozzle for retarding the movement of the empty casing as it approches the discharge end of the nozzle.

11. A sausage stuffing and feeding apparatus as recited in claim 9 and a plate member mounted on said housing and having a free margin with a slot therein for straddling a portion of the stuffing horn adjacent the discharge end thereof when the housing is in position for engaging the associated roller with the casing on the horn whereby to insure smooth unfolding of the shirred casing as it is advanced by pressure of the batter discharged into the casing through the nozzle.

References Cited by the Examiner
UNITED STATES PATENTS

| | | | |
|---|---|---|---|
| 1,639,270 | 8/1927 | Potter | 17—34 |
| 2,528,234 | 10/1950 | Lilien | 17—34 |
| 2,666,229 | 1/1954 | Vogt | 17—32 X |
| 2,708,287 | 5/1955 | Long et al. | 17—32 |
| 3,166,784 | 1/1965 | Millenaar et al. | 17—33 |

SAMUEL KOREN, *Primary Examiner.*

LUCIE H. LAUDENSLAGER, *Examiner.*